US006651612B2

United States Patent
Kobayashi

(10) Patent No.: US 6,651,612 B2
(45) Date of Patent: Nov. 25, 2003

(54) IN-CYLINDER INJECTION TYPE SPARK-IGNITION INTERNAL COMBUSTION ENGINE

(75) Inventor: Tatsuo Kobayashi, Susono (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 0 days.

(21) Appl. No.: 10/213,070

(22) Filed: Aug. 7, 2002

(65) Prior Publication Data
US 2003/0037760 A1 Feb. 27, 2003

(30) Foreign Application Priority Data
Aug. 24, 2001 (JP) .......................................... 2001-254507

(51) Int. Cl.[7] ................................................. F02B 23/10
(52) U.S. Cl. ...................... 123/298; 123/193.6; 123/305
(58) Field of Search ................................ 123/276, 295, 123/298, 305, 193.6

(56) References Cited

U.S. PATENT DOCUMENTS 4,920,937 A * 5/1990 Sasaki et al. ............... 123/305
5,921,215 A * 7/1999 Wirth et al. ................ 123/298
6,378,486 B1 * 4/2002 Spiegel et al. .............. 123/298
6,378,490 B1 * 4/2002 Ottowitz et al. ............ 123/305

FOREIGN PATENT DOCUMENTS

| JP | A 5-179961 | 7/1993 |
| JP | A 2000-97031 | 4/2000 |
| JP | A 2000-303844 | 10/2000 |

* cited by examiner

Primary Examiner—Tony M. Argenbright
(74) Attorney, Agent, or Firm—Oliff & Berridge, PLC

(57) ABSTRACT

An in-cylinder injection type spark-ignition internal combustion engine includes a spark plug, a fuel injection valve, and a piston having a top face and a cavity formed in a first part of the top face. The cavity is located closer to the fuel injection valve with respect to a center of the piston so as to bring the injected fuel toward the spark plug. A space formed in the cylinder at a top dead center of a compression stroke of the piston includes a first space in which a center of the cavity is located, and a second space. The top face of the piston is designed so as to reduce a volumetric difference between the first space and the second space, thereby preventing generation of a strong air stream flowing between the first space and the second space at around the top dead center.

5 Claims, 3 Drawing Sheets

IN-CYLINDER INJECTION TYPE SPARK-IGNITION INTERNAL COMBUSTION ENGINE

INCORPORATION BY REFERENCE

This disclosure of Japanese Patent Application No. 2001-254507 filed on Aug. 24, 2001 including the specification, drawings and abstract is incorporated herein by reference in its entirety.

BACKGROUND OF THE INVENTION

1. Field of the Invention

The invention relates to an in-cylinder injection type spark-ignition internal combustion engine.

2. Description of Related Art

An in-cylinder injection type spark-ignition internal combustion engine, in which a fuel is injected directly into each cylinder of the engine during a latter half of a compression stroke is known. The engine provides a fine combustible air-fuel mixture concentrated around a spark plug, which allows a stratified charge combustion that assures combustion of the air-fuel mixture within the cylinder while keeping an overall air-fuel ratio of the air-fuel mixture lean.

In such an in-cylinder injection type spark-ignition internal combustion engine, the spark plug is arranged at an upper portion nearly at the center of the cylinder, and a fuel injection valve is arranged at an upper portion of the cylinder. The fuel injected during the latter half of the compression stroke enters into a cavity formed in a part of a top face of a piston and is guided toward the spark plug along a configuration of the cavity. As a result, the combustible air-fuel mixture is concentrated around the spark plug. For that reason, the cavity is located closer to the fuel injection valve such that the center of the cavity deviates from the center of the piston.

In the case where the cavity is formed in the top face of the piston as described above, when the piston approaches the upper wall of the cylinder at the latter half of the compression stroke, an air stream is generated around the spark plug, flowing toward the cavity formed in the part of the top face of the piston from the other part of the top face of the piston where no cavity is formed.

The stratified charge combustion is required even at high engine speeds so as to improve the fuel efficiency. However, the air stream generated around the spark plug during the latter half of the compression stroke is further intensified at high engine speeds. Accordingly the air stream, thus, disperses the combustible air-fuel mixture formed around the spark plug. Thus, it is unlikely that the stratified charge combustion at high engine speeds is successfully accomplished In Japanese Patent Laid-Open Publication No. 2000-97031, the ratio of volumes of the cylinder space above the cavity to the total volume of the cylinder is within a range between 0.4 and 0.6 at a top dead center (TDC) of the compression stroke. Even with the aforementioned arrangement, the intensified air stream is still generated around the spark plug at high engine speeds, failing to realize good stratified charge combustion.

SUMMARY OF THE INVENTION

The invention thus provides a successful stratified charge combustion at high engine speeds in an in-cylinder injection type spark-ignition internal combustion engine with the aid of a cavity formed in a top face of the piston.

An in-cylinder injection type spark-ignition internal combustion engine includes a spark plug disposed at an upper portion of a cylinder, a fuel injection valve through which a fuel is directly injected into the cylinder, and a piston having a top face and a cavity formed in a first part of the top face. The cavity is located closer to the fuel injection valve with respect to a center of the piston so as to bring the fuel injected through the fuel injection valve toward the spark plug. A space formed in the cylinder at a top dead center of a compression stroke of the piston includes a first space in which a center of the cavity is located, and a second space. The first space is located on one side of a plane that passes through a center axis of the spark plug in parallel with a center axis of the cylinder and is perpendicular to a radial direction in which the center of the cavity deviates from the center of the piston. The second space is located on the other side of the plane. The top face of the piston is designed so as to reduce a volumetric difference between the first space and the second space, thereby preventing generation of a strong air stream flowing between the first space and the second space at around the top dead center.

The volumetric ratio of the first space to the second space is set to be within a range between 6:4 and 5:5.

A protruding portion is formed on the top face of the piston along a peripheral portion of the cavity.

BRIEF DESCRIPTION OF THE DRAWINGS

The foregoing and further objects, features and advantages of the invention will become apparent from the following description of preferred exemplary embodiments with reference to the accompanying drawings, wherein like numerals are used to represent like elements and wherein.

DETAILED DESCRIPTION OF PREFERRED EMBODIMENTS

Figure 1:
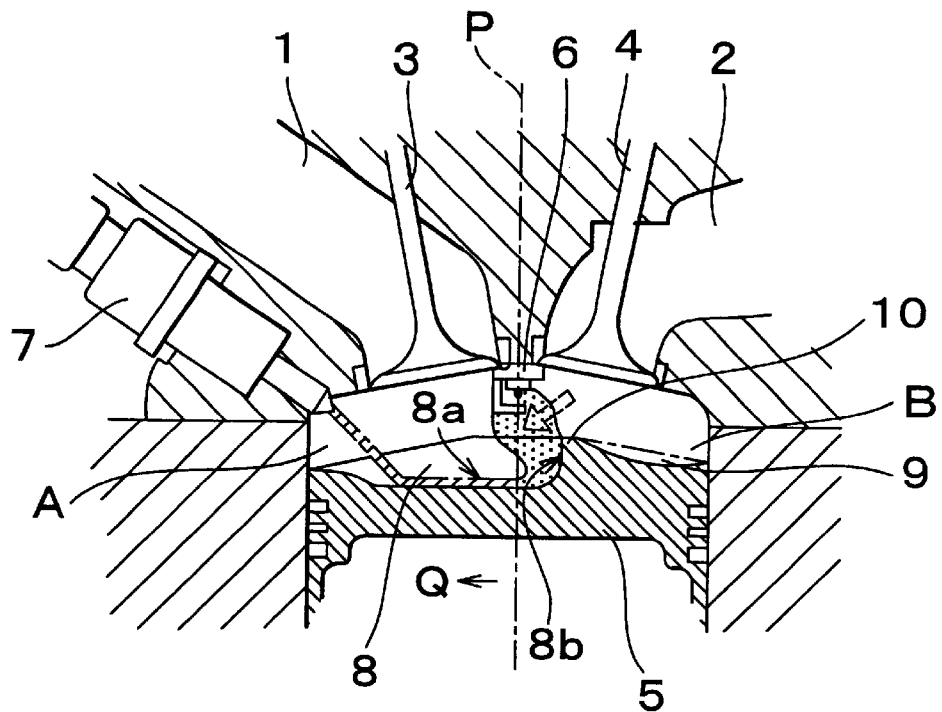
FIG. 1 is a longitudinal cross sectional view showing schematically a first exemplary embodiment of the in-cylinder injection type spark-ignition internal combustion engine according to the invention.

FIG. 1 is a longitudinal cross sectional view schematically illustrating an in-cylinder injection type spark ignition internal combustion engine according to a first exemplary embodiment of the invention. An intake port 1 communicates with a cylinder through an intake valve 3 and an exhaust port 2 communicates with the cylinder through an exhaust valve 4. A spark plug 6 is arranged at an upper portion nearly at the center of the cylinder. A fuel injection valve 7 for directly injecting the fuel from the upper portion into the cylinder is arranged at the side of the intake port 1 where the temperature becomes relatively low because of an intake air stream generated in a combustion chamber so as to prevent vaporization of the fuel.

Figure 2:
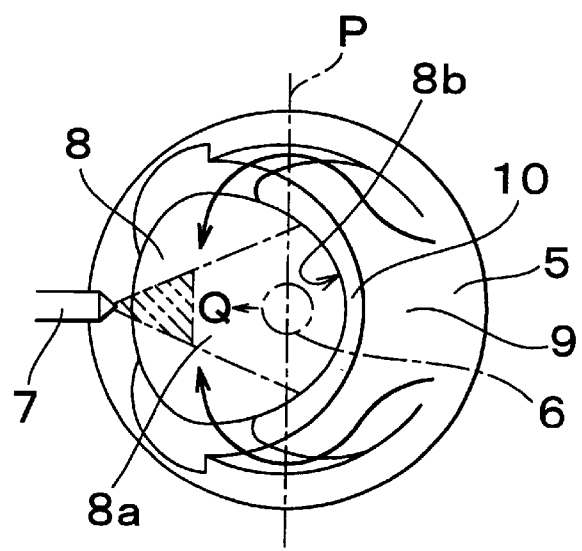
FIG. 2 is a plan view showing a piston of the in-cylinder injection type spark-ignition internal combustion engine shown in FIG. 1.

FIG. 2 is a plan view of the piston 5. Referring to FIGS. 1 and 2, a concave cavity 8 is formed in a top face of the piston 5. The cavity 8 is located closer to the fuel injection valve 7 with respect to the center of the top face of the piston 5. That is, the center of the cavity 8 deviates from the center of the piston 5 toward the fuel injection valve 7. The fuel injection valve 7 is provided with a slit-like nozzle hole, through which fuel is injected to form a thin sectorial spray. The fuel is injected into the cavity 8 during a latter half of a compression stroke so as to perform the stratified charge combustion. The fuel immediately after being injected is still in a liquid state as shown by an inclined face in FIG. 1. However, as the injected fuel proceeds along a bottom wall 8a of the cavity 8 and is introduced by a side wall 8b opposing the fuel injection valve 7 toward the spark plug 6, the fuel is vaporized. Then the vaporized fuel becomes a highly ignitable air-fuel mixture at the ignition timing as shown by dots in FIG. 1. A combustible air-fuel mixture is concentrated only in the region around the spark plug 6 as described above so as to realize good stratified charge combustion that allows combustion of a lean air-fuel mixture in the cylinder.

Since the thin sectorial spray of the fuel spreads in the direction of width as it proceeds along the bottom wall 8a of the cavity 8, the heat can be robbed by a large part of the bottom wall 8a of the cavity 8. The center portion of the fuel that has spread in the direction of width is led toward the spark plug 6 by the side wall 8b serving to cause the fuel to rise up. Meanwhile both sides of the spread fuel impinge acutely against the side wall 8b having an arc shape as shown in FIG. 2. As a result, the fuel is led toward the spark plug 6 by the force that causes the fuel to move not only upward but also toward the center of the piston.

Compared with the fuel spray of a conical shape, the thin sectorial fuel spray is capable of forming a lump of combustible air-fuel mixture in a good vaporized state in the region around the spark plug 6. This makes it possible to increase the fuel injection amount during the stratified charge combustion. The stratified charge combustion of a low specific fuel consumption rate may be expanded to the region at a high engine speed and a high load. It is understood that the fuel injector that forms a sectorial fuel spray is not an essential element for the invention. It is possible to use the fuel injector that forms the conical or columnar fuel spray.

When a large amount of fuel is required for the engine in a high load state, the sectorial fuel spray formed only at the end of the compression stroke may fail to supply sufficient amount of the fuel. In such a case, the fuel may be injected at the intake stroke so as to perform the uniform combustion.

To realize a good stratified charge combustion, it is necessary to keep the combustible air-fuel mixture around the spark plug 6 at the ignition timing. In the state where the cavity 8 is formed in the top face of the piston 5 closer to the fuel injection valve 7, as the piston approaches the upper wall of the cylinder at the end of the compression stroke, an air stream is generated around the spark plug 6 at the upper portion nearly center of the cylinder. As an arrow in FIG. 2 shows, the generated air stream flows toward the cavity formed in the top face of the piston. In case of high engine speeds, the air stream is intensified enough to disperse the combustible air-fuel mixture formed around the spark plug. This may deteriorate the ignitability, resulting in misfire.

In an exemplary embodiment of the invention, a recess 9 is formed on an inclined face of the piston where no center of the cavity is located as shown by a chain line of FIG. 1.

It is assumed that a space inside the cylinder defined by the top face of the piston and the cylinder at a top dead center includes a space A having the cavity formed in the top face of the piston closer to the fuel injection valve, and a space B which are parted by a virtual plane P that passes through a center axis of the spark plug 6 in parallel with the center axis of the cylinder and is perpendicular to a radial direction Q of the cavity 8 in which the center of the cavity deviates from the center of the piston. The space A, in general, has a volume considerably greater than that of the space B. Meanwhile, in the exemplary embodiment, as the space B has the recess 9, the volumetric difference between the space A and the space B is reduced.

Accordingly in the exemplary embodiment, it is possible to prevent generation of the air stream flowing from the space B to the space A. In other words, the aforementioned arrangement may prevent generation of the air stream around the spark plug 6. According to the exemplary embodiment of the invention, therefore, the strong air stream is unlikely to be generated around the spark plug 6 even at the high engine speeds. Therefore, the combustible air-fuel mixture may be kept around the spark plug even at the ignition timing, resulting in good stratified charge combustion.

Figure 3:
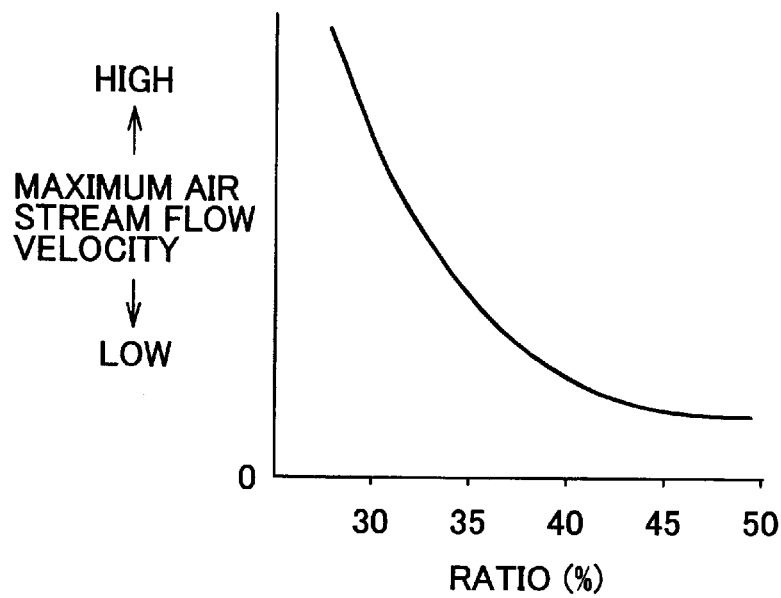
FIG. 3 is a graph showing changes in the maximum flow velocity of an air stream in an area near the spark plug when the volumetric ratio of the two spaces in the cylinder divided by a plane that passes through a central axis of the spark plug is varied.

FIG. 3 is a graphical representation of the experimental results with respect to the relationship between a volumetric ratio (%) of the space B to the total volume of the cylinder space at the TDC and the maximum flow velocity of the air stream around the spark plug. Referring to FIG. 3, as the ratio approaches 50%, the volumetric difference between the space A and the space B is reduced as small as possible, the maximum flow velocity decreases. If the ratio is maintained within the range between 40% and 50%, namely, if the volumetric ratio of the space A to the space B is set to be within the range between 6:4 and 5:5, the maximum flow velocity of the air stream can be kept relatively small. In that condition, a strong air stream will not be generated, preventing dispersion of the combustible air-fuel mixture.

According to the exemplary embodiment of the invention, the space B includes a part of the cavity as shown in FIGS. 1 and 2. The air stream that flows into the cavity, thus, may be generated in the space B. Since the volumetric difference between the space A and the space B is kept small, the air stream flowing into the cavity in the space B is kept from moving into the space A. It is, however, impossible to completely prevent the air stream from flowing to the space A by making the volumetric difference between the space A and the space B at 0. Therefore, the weak air stream may be generated around the spark plug.

Though such a weak air stream does not serve to disperse the combustible air-fuel mixture around the spark plug 6, the air stream around the spark plug 6 is not preferable for the stratified charge combustion. In the exemplary embodiment, a protruding portion 10 is formed in a periphery of the cavity 8 in the space B.

The protruding portion 10 serves to prevent generation of the air stream flowing into the cavity in the space B. In the embodiment, the generated air stream flows from the space A into the cavity in the space B. Then the air on the top face of the piston in the space B moves along the protruding portion 10 and flows into the cavity 8 in the space A from its periphery. The aforementioned arrangement makes it possible to keep the air stream around the spark plug 6 as least as possible.

Figure 4:
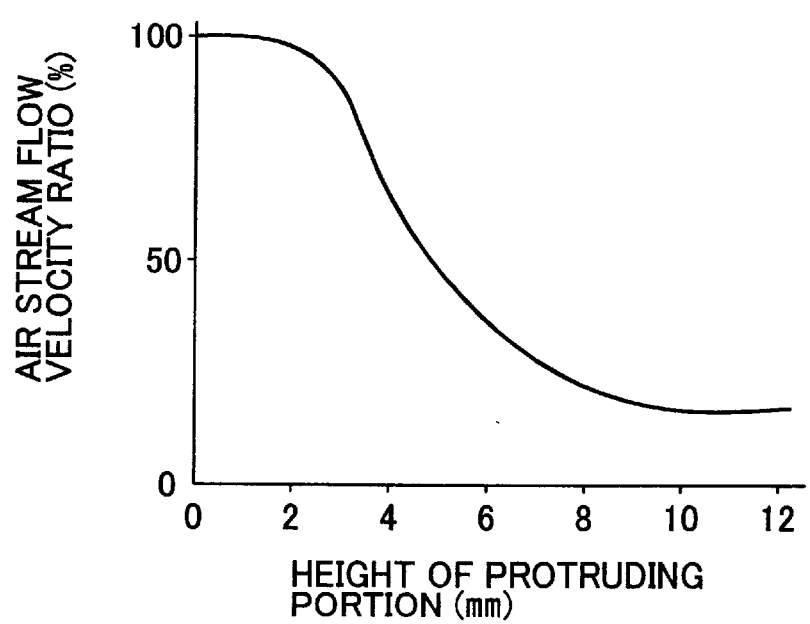
FIG. 4 is a graph showing changes in the flow velocity of the air stream produced in the area near the spark plug when the height of the protruding portion in the cavity is varied.

FIG. 4 is a graphical representation showing experimental results of a relationship between a height of the protruding portion 10 (mm) and a ratio of the flow velocity around the spark plug in case of having the protruding portion 10 to the flow velocity in case of having no protruding portion. If the protruding portion is not formed, the height of the protruding portion is 0 mm, and, therefore the flow velocity ratio is 100%. As shown in FIG. 4, as the height of the protruding portion increases, the air stream around the spark plug becomes more likely to be suppressed. This is because as the protruding portion increases, it becomes less likely that the gas flows from the top face of the piston directly into the cavity within the space B. If the height of the protruding portion is 4 mm or greater, the air stream can be suppressed substantially by half, making it possible to sufficiently suppress the intensity of the air stream around the spark plug.

Figure 5:
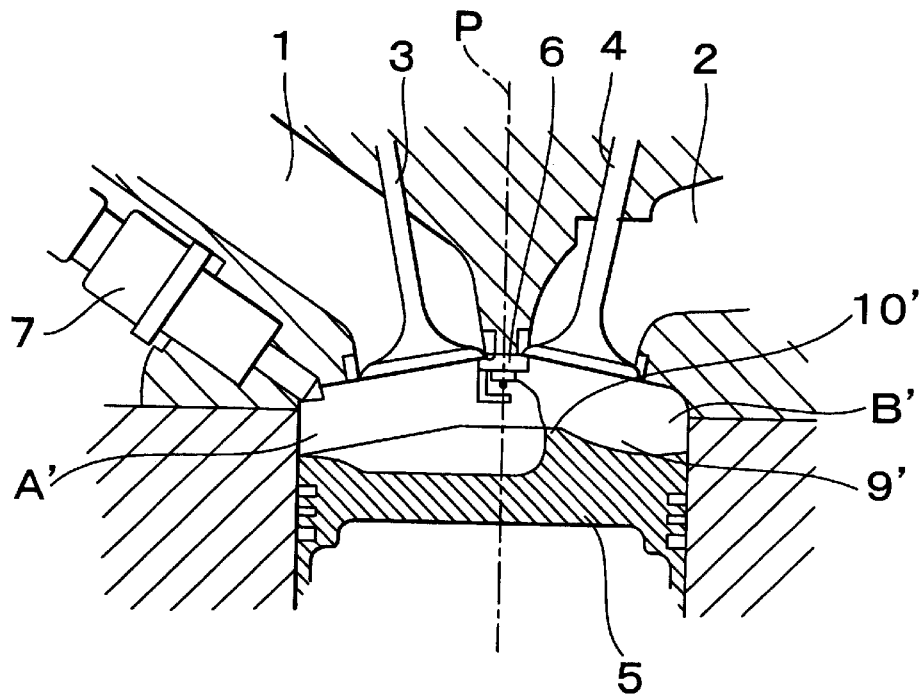
FIG. 5 is a longitudinal cross sectional view showing schematically a second exemplary embodiment of the in-cylinder injection type spark-ignition internal combustion engine according to the invention.
Figure 6:
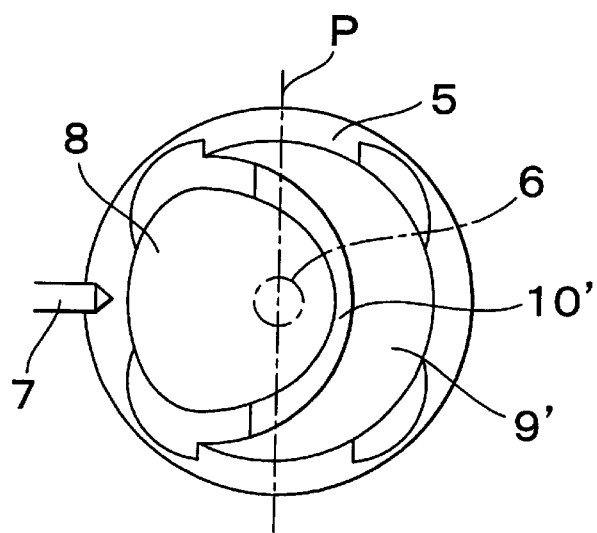
FIG. 6 is a plan view showing a piston of the in-cylinder injection type spark-ignition internal combustion engine shown in FIG. 5.

FIGS. 5 and 6 show a second exemplary embodiment of the in-cylinder injection type spark-ignition internal combustion engine according to the invention. The same reference numerals are used to represent like elements as those in the first exemplary embodiment. As compared with the first exemplary embodiment, a recess 9' formed in the top face of the piston in the space B has a depth greater than that of the recess 9 of the first exemplary embodiment. In contrast to the first exemplary embodiment, the volumetric difference between the space A' and the space B' can further be reduced to nearly 0. That is, it is possible to set a volumetric ratio of the space A' to the space B' at approximately 5:5.

As a result, generation of the flow of the air stream between the space A' and the space B' can further be suppressed. Additionally the height of the protruding portion 10' increases as the depth of the recess 9' increases so as to sufficiently suppress the air stream around the spark plug.

The air stream generated in the cylinder at the end of the compression stroke is mainly caused to flow in the direction Q in the cavity formed in the top face of the piston. For this reason, in both of the first and the second exemplary embodiments, the space of the cylinder defined by the piston top face at the TDC includes two spaces, space A and space B differentiated by a virtual plane P passing through the center axis of the spark plug and perpendicular to the direction Q. Then the volumetric difference between these two spaces is reduced so as to suppress generation of the air stream flowing in the direction Q. It is preferable to reduce the volumetric difference between the two spaces differentiated by an arbitrary virtual plane passing through the center axis of the spark plug. If the volumetric difference between those two spaces becomes relatively large, a strong air stream flowing between those two spaces may be generated to disperse the combustible air-fuel mixture around the spark plug. In both of the first and the second exemplary embodiments according to the invention, the spark plug is disposed at an upper portion nearly at the center of the cylinder. It is unlikely that the volumetric difference between the two spaces differentiated by an arbitrary plane passing through the center axis of the spark plug becomes substantially large.

An in-cylinder injection type spark-ignition internal combustion engine includes a spark plug disposed at an upper portion of a cylinder, a fuel injection valve through which a fuel is directly injected into the cylinder, and a piston having a top face and a cavity formed in a first part of the top face. The cavity is located closer to the fuel injection valve with respect to a center of the piston so as to bring the fuel injected through the fuel injection valve toward the spark plug. A space formed in the cylinder at a top dead center of a compression stroke of the piston includes a first space in which a center of the cavity is located, and a second space. The first space is located on one side of a plane that passes through a center axis of the spark plug in parallel with a center axis of the cylinder and is perpendicular to a radial direction in which the center of the cavity deviates from the center of the piston. The second space is located on the other side of the plane. The top face of the piston is designed so as to reduce a volumetric difference between the first space and the second space, thereby preventing generation of a strong air stream flowing between the first space and the second space at around the top dead center. This makes it possible to prevent generation of a strong air stream around the spark plug at TDC flowing between two spaces even at a high engine speed. Accordingly the combustible air fuel mixture formed around the spark plug cannot be dispersed, resulting in good stratified combustion.

While the invention has been described with reference to preferred exemplary embodiments thereof, it is to be understood that the invention is not limited to the disclosed embodiments or constructions. On the contrary, the invention is intended to cover various modifications and equivalent arrangements. In addition, while the various elements of the disclosed invention are shown in various combinations and configurations, which are exemplary, other combinations and configurations, including more less or only a single element, are also within the spirit and scope of the invention.

What is claimed is:

1. An in-cylinder injection type, spark-ignition internal combustion engine, comprising:

a spark plug disposed at an upper portion of a cylinder;

a fuel injection valve through which fuel is directly injected into the cylinder; and a piston having a top face and a cavity formed in a first part of the top face, the cavity being located closer to the fuel injection valve with respect to a center of the piston so as to bring the fuel injected through the fuel injection valve toward the spark plug, wherein a space formed in the cylinder at a top dead center of a compression stroke of the piston includes a first space in which a center of the cavity is located, and a second space, the first space being located on one side of a plane that passes through a center axis of the spark plug in parallel with a center axis of the cylinder and is perpendicular to a radial direction in which the center of the cavity deviates from the center of the piston, and the second space being located on the other side of the plane, the top face of the piston is designed to set a volumetric difference between the first space and the second space to be within a range between 6:4 and 5:5.

2. An in-cylinder injection type spark-ignition internal combustion engine according to claim 1, wherein the second space includes a recess portion formed in a second part of the top face of the piston so as to reduce the volumetric difference between the first space and the second space.

3. An in-cylinder injection type spark-ignition internal combustion engine according to claim 1, wherein a protruding portion is formed on the top face of the piston along a peripheral portion of the cavity.

4. An in-cylinder injection type spark-ignition internal combustion engine according to claim 3, wherein the protruding portion is at least partially defined by the cavity and the recess portion.

5. An in-cylinder injection type spark-ignition internal combustion engine according to claim 3, wherein the height of the protruding portion is equal to or greater than approximately 4 mm.

* * * * *